(12) United States Patent
Wolosewicz

(10) Patent No.: US 12,229,282 B2
(45) Date of Patent: Feb. 18, 2025

(54) LIGHTWEIGHT ENCRYPTION

(71) Applicant: Cyberus Labs sp. z o.o., San Francisco, CA (US)

(72) Inventor: Jack Wolosewicz, San Francisco, CA (US)

(73) Assignee: Cyberus Labs sp. z o.o., San Francisco, CA (US)

( * ) Notice: Subject to any disclaimer, the term of this patent is extended or adjusted under 35 U.S.C. 154(b) by 0 days.

(21) Appl. No.: 18/110,583

(22) Filed: Feb. 16, 2023

(65) Prior Publication Data
US 2023/0195908 A1  Jun. 22, 2023

Related U.S. Application Data

(63) Continuation of application No. 17/220,792, filed on Apr. 1, 2021, now Pat. No. 11,615,196.

(60) Provisional application No. 63/004,433, filed on Apr. 2, 2020.

(51) Int. Cl.
G06F 21/60 (2013.01)
G06F 9/32 (2018.01)
G06F 9/54 (2006.01)
G06F 21/78 (2013.01)

(52) U.S. Cl.
CPC ............ *G06F 21/602* (2013.01); *G06F 9/321* (2013.01); *G06F 9/544* (2013.01); *G06F 21/78* (2013.01)

(58) Field of Classification Search
CPC ........ G06F 21/602; G06F 21/78; G06F 9/321; G06F 9/544
See application file for complete search history.

(56) References Cited

U.S. PATENT DOCUMENTS

| | | | |
|---|---|---|---|
| 2016/0212617 A1* | 7/2016 | Koshimizu | H04W 12/35 |
| 2017/0208062 A1* | 7/2017 | Morikawa | H04L 9/0877 |
| 2017/0214660 A1* | 7/2017 | Shah | H04L 63/061 |
| 2020/0213106 A1* | 7/2020 | Kang | H04L 9/0643 |

* cited by examiner

*Primary Examiner* — Sangseok Park
(74) *Attorney, Agent, or Firm* — STLG Law Firm; Soody Tronson

(57) ABSTRACT

Briefly, an encryption/decryption algorithm providing for consistent encryption entropy and encryption/decryption performance that is independent of the type of input data.

18 Claims, 2 Drawing Sheets

LIGHTWEIGHT ENCRYPTION

FIELD OF INVENTION

Embodiments of the present invention relate to methods for encryption for Internet of things (IoT) devices.

BACKGROUND

The Internet of things (IoT) is a system of interrelated computing devices, mechanical and digital machines are provided with unique identifiers and the ability to transfer data over a network without requiring human-to-human or human-to-computer interaction. One of the key drivers of the IoT is data. In order to be successful, data must be accessible for storage and processing. Accessibility creates potential privacy and security dangers for users of devices connected with IoT. Because IoT devices are typically limited in processing ability, complex encryption methods may be difficult to enable.

As such, lightweight encryption methods are provided herein.

SUMMARY

The disclosed encryption/decryption algorithm produces consistent encryption entropy and encryption/decryption performance that is independent of the type of input data.

The performance gains over currently used algorithms allows for improved security on a wide range of IoT devices that would otherwise have either substandard encryption or no encryption at all. This is because the disclosed encryption/decryption algorithm employs no computation in the encryption process, other that the calculations needed to update buffer pointers and counters.

The methods disclosed utilize two randomized lookup buffers, a key buffer and an offset buffer, as well as a histogram buffer. The two lookup buffers are initialized with a secret key shared (identical seed value) between the Client/Server (Or Hub/Device in the IoT world). Methods also support the generation of MAC values (Message Authentication Code) which is sent with an encrypted message to ensure data integrity, the authenticity of the message and key synchronization.

BRIEF DESCRIPTION OF THE DRAWINGS

Non-limiting and non-exhaustive features of the present invention are described with reference to the following figures, wherein like reference numerals refer to like parts throughout the various figures.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The symmetric nature of the dynamic key algorithm ensures that both, the encryption and the decryption side of any message transmission causes the keys to change and update identically. The key updating process uses transmitted data as a randomizing component in key generation, so in effect, the key mechanism functions as a historical hash of all preceding encrypted message transmissions. This has two benefits. One is that even if key interception was possible, that key would be updated within one Byte of transmission, rendering it useless for an attacker. The other is that the key, being a product of transmission history between two points, creates an authentication mechanism by continued and growing entanglement of participating, authorized devices via dynamic, matching keys, which represent all preceding communications between the two entangled devices. Typically, the entangled device pair would comprise a hub and an endpoint like a sensor or actuator. So, in effect this creates a two node blockchain which contains a digest of the history of all interactions between these two nodes. This makes the algorithm a type of encryption called Authenticated Encryption, meaning that both sides of transmission are securely authenticated. Device authentication is a key requirement of IoT systems.

Additionally, the One Time Pad approach to symmetric encryption used in this scheme makes the algorithm resilient to brute force cryptanalytic attacks such as ones used successfully in Quantum Computer attacks on conventional encryption. The proposed encryption is designed for the Quantum Computer Era, for which era the cybersecurity community has great concerns.

Figure 1:
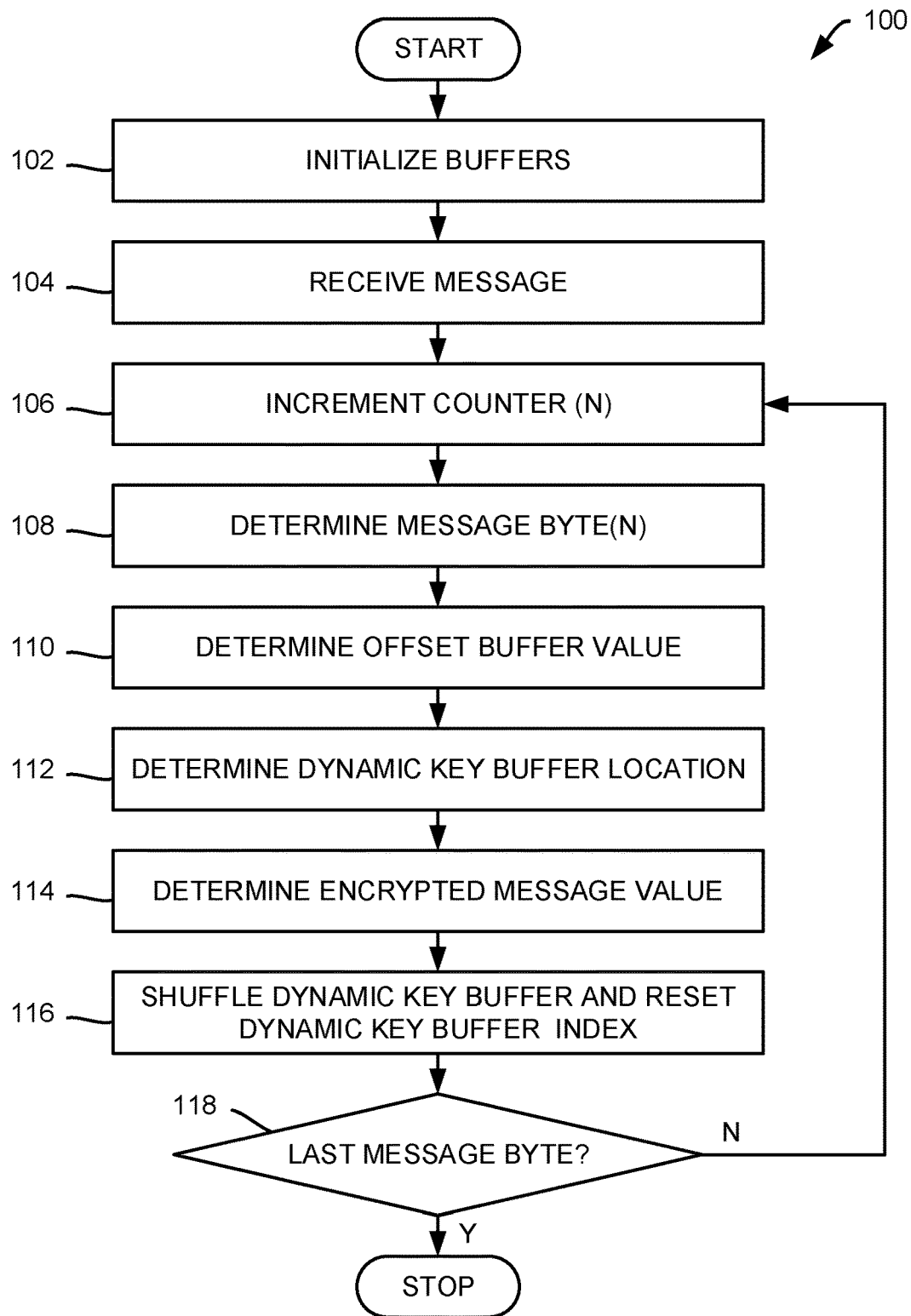
FIG. 1 is an illustrative flowchart of methods for lightweight encryption embodying features of the present invention.

FIG. 1 is an illustrative flowchart 100 of methods for lightweight encryption embodying features of the present invention. At a first step 102, the method initializes buffers. In embodiments, at least three buffers are utilized namely: an offset buffer, a dynamic key buffer, and a dynamic key buffer index (or histogram buffer). In embodiments, both the offset buffer and dynamic key buffers are initialized with 256 values from 0 to 255 that are randomly shuffled. The dynamic key buffer index is initialized with the location index of each value from 0 to 255 in the dynamic key buffer after an initial shuffle (see step 116 below). Initialization proceeds on both the encrypting device and the decrypting device (e.g., client/server, hub/device) (see also step 202, FIG. 2). Utilizing methods provided herein, the initialization on the devices is the same and is accomplished using the identical seed values on both devices. As such, the seed value may, in some embodiments, be considered a secret key equivalent.

At a next step 104, the method receives the message for encryption and continues to a step 106 to increment a counter. Methods presented herein encrypt messages in a byte-by-byte fashion. As such, at a next step 108, the method determines the message byte (n) where n is equal to the counter incremented at a step 106. For example, when a message is received, the counter is incremented from 0 to 1. Thus, the byte being determined at a step 108 is the first message byte or message byte (1). At a next step 110, the method determines the offset buffer value. In embodiments, the offset buffer value is the value in the offset buffer at the location indicated by the counter. For example, if the counter is equal to 15, then the value of the offset buffer at location 15 is the offset buffer value. At a next step 112, the method determines the dynamic key buffer location. In embodiments, the dynamic key buffer location is the location indicated by the sum of the message byte (n) value and the offset buffer value. At a next step 114, the method determines the encrypted message value. In embodiments, the encrypted message value is the value of the dynamic key buffer at the location indicated by the dynamic key buffer location determined at a step 112.

At a next step 116, the method shuffles the dynamic key buffer and resets (or initializes in the first shuffle) the dynamic key buffer index. In embodiments, shuffling the dynamic key buffer is accomplished by swapping the last value in the dynamic key buffer with the encrypted value determined at a step 114 and shuffling the buffer upward to replace the encrypted value location. In addition, the dynamic key buffer index is reset (or initialized in the first shuffle) with the location index of each value from 0 to 255 in the dynamic key buffer after the shuffle. The method continues to step 118 to determine whether the last message byte has been received. If the method determines at a step 118 that the last message byte has not been received, the method returns to a step 106 to increment counter (n). If the method determines at a step 118 that the last message byte has been received, the method ends.

The structure of the key buffer is such that it changes with every byte of encryption, randomizing itself by combining (or hashing) the previous key buffer with current data transmission bytes. The resulting, updated key buffer is, in effect, a type of hash of the previous key buffer and the data payload. This is not unlike what blockchain does with updated transactions. In embodiments, the key buffer also reflects the updated transaction, but the transaction is an encryption event. Consequently, the key buffer holds the history of previous encryption events which took place between the two participants in the encryption and decryption process. It is therefore an authenticated encryption process where both devices involved in the process are authenticated by their shared history. This is a key asset of the algorithm as IoT device authentication is a necessary part of secure IoT communications.

Figure 2:
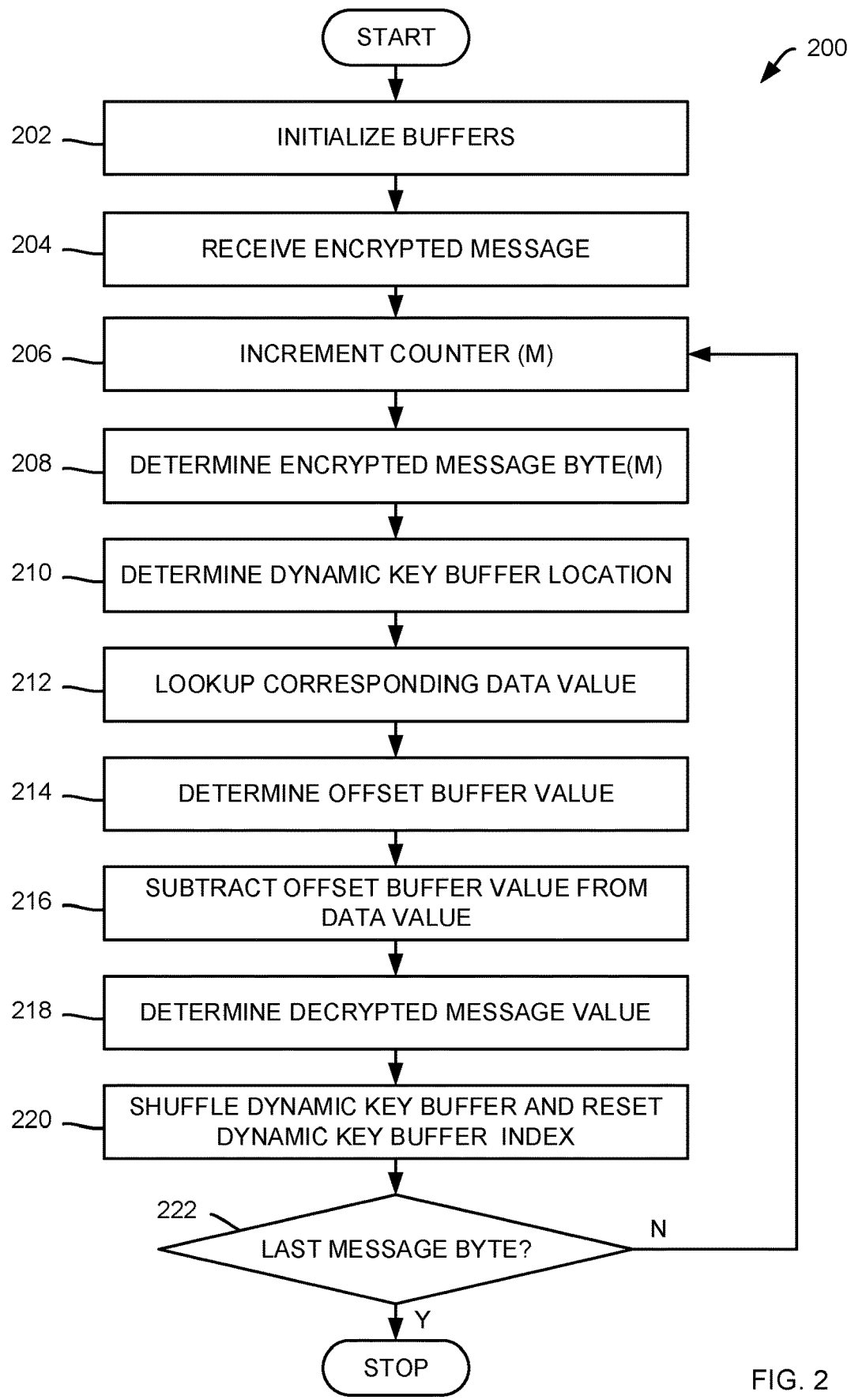
FIG. 2 is an is an illustrative flowchart of methods for decrypting lightweight encryption embodying features of the present invention.

FIG. 2 is an is an illustrative flowchart 200 of methods for decrypting lightweight encryption embodying features of the present invention. At a first step 202, the method initializes buffers. As noted above, utilizing methods provided herein, the initialization on the devices is the same and is accomplished using the identical seed values on both devices (i.e., the encrypting device and the decrypting device). In embodiments, at least three buffers are utilized namely: an offset buffer, a dynamic key buffer, and a dynamic key buffer index (or histogram buffer). In embodiments, both the offset buffer and dynamic key buffers are initialized with 256 values from 0 to 255 that are randomly shuffled using an identical seed value. At a next step 204, the method receives an encrypted message. Methods presented herein decrypt messages in a byte by byte fashion. As such, at a next step 208, the method determines the message byte (m) where m is equal to the counter incremented at a step 206. For example, when a message is received, the counter is incremented from 0 to 1. Thus, the byte being determined at a step 208 is the first encrypted message byte or encrypted message byte (1).

At a next step 210, the method determines the dynamic key buffer location. In embodiments, the dynamic key buffer location is the location in the dynamic key buffer indicated by the encrypted message byte value determined at a step 208. At a next step 212 the method looks up the corresponding data value in the dynamic key buffer at the location determined in a step 210. The method then determines the offset buffer value at a step 214. In embodiments, the offset buffer value is the value in the offset buffer at the location indicated by the counter. For example, if the counter is equal to 15, then the value of the offset buffer at location 15 is the offset buffer value. At a next step 216, the method subtracts the offset buffer value determined at a step 214 from the data value in the dynamic key buffer looked up at a step 212, which determines the decrypted message value at a step 218.

The method continues to a step 220 to shuffle the dynamic key buffer and resets (or initializes in the first shuffle) the dynamic key buffer index. In embodiments, shuffling the dynamic key buffer is accomplished by swapping the last value in the dynamic key buffer with the encrypted value determined at a step 208. In other words, the used key buffer byte is sent to the bottom of the key buffer while the bottom byte plugs that hole. The method continues to step 222 to determine whether the last encrypted message byte has been received. If the method determines at a step 222 that the last message byte has not been received, the method returns to a step 206 to increment counter (n). If the method determines at a step 222 that the last message byte has been received, the method ends.

The disclosed encryption/decryption algorithm is a symmetric lightweight binary substitution cipher specifically developed with the hardware and software constraints of embedded systems in mind. Embodiments feature a fast, yet highly secure, algorithm that can seamlessly encrypt and decrypt both data streams as well as data blocks.

At its core is a binary substitution implementation that utilizes a self-randomizing key buffer which continuously morphs to ensure high encryption entropy while simultaneously delivering superior performance when compared to industry standard block ciphers.

The disclosed encryption/decryption algorithm produces consistent encryption entropy and encryption/decryption performance that is independent of the type of input data. There are no input data size restrictions (no required block size) which avoids potential block padding issues that exists with traditional block ciphers.

The performance gains over currently used algorithms allows for improved security on a wide range of IoT devices that would otherwise have either substandard encryption or no encryption at all. This is because the disclosed encryption/decryption algorithm employs no computation in the encryption process, other that the calculations needed to update buffer pointers and counters.

At its core, methods disclosed utilize two randomized lookup buffers, a key buffer and an offset buffer, as well as a histogram buffer. The two lookup buffers are initialized with a secret key shared (identical seed value) between the Client/Server (Or Hub/Device in the IoT world). Methods also support the generation of MAC values (Message Authentication Code) which is sent with an encrypted message to ensure data integrity, the authenticity of the message and key synchronization.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods, computer program products, and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for transmitting messages utilizing lightweight encryption and decryption comprising:
    encrypting the message to create an encrypted message on an encrypting device utilizing a shared key that is repeatedly updated using an encrypted message value corresponding with the message as a randomizing component in generating the shared key, wherein the shared key is a product of a transmission history between two points, and wherein the encrypted message value comprises a dynamic key buffer value at a dynamic key buffer location;
    transmitting the encrypted message; and
    decrypting the encrypted message on a decrypting device utilizing the shared key.

2. The method of claim 1, wherein the encrypting comprises:
    initializing a first plurality of buffers on the encrypting device;
    receiving the message for encrypting;
    incrementing a first counter for (n);
    determining a message byte (n);
    determining a first offset buffer value (n);
    determining a first dynamic key buffer location by summing the message byte (n) and the first offset buffer value (n); and
    determining the encrypted message value corresponding with a first dynamic key buffer value at the first dynamic key buffer location.

3. The method of claim 2, wherein the first plurality of buffers comprises:
    a first offset buffer;
    a first dynamic key buffer; and
    a first dynamic key buffer index.

4. The method of claim 3, further comprising:
    shuffling the first dynamic key buffer;
    resetting the first dynamic key buffer index; and
    continuing to the incrementing the first counter until a last message byte is received.

5. The method of claim 4, wherein the shuffling the first dynamic key buffer comprises:
    swapping a last value in the first dynamic key buffer with the encrypted message value; and
    shuffling the first dynamic key buffer upward to replace an encrypted value location.

6. The method of claim 4, wherein resetting the first dynamic key buffer index generates a location index of each value from 0 to 266 in the first dynamic key buffer after the shuffling.

7. The method of claim 2, wherein the initializing utilizes an identical seed value on the encrypting device and the decrypting device.

8. The method of claim 7, wherein the first offset buffer and the first dynamic key buffers are initialized with 267 values from 0 to 266 that are randomly shuffled using the identical seed value.

9. The method of claim 1, wherein the decrypting the encrypted message comprises:
    initializing a second plurality of buffers on the decrypting device;
    receiving the encrypted message;
    incrementing a second counter for (m);
    determining an encrypted message byte (m);
    determining a second dynamic key buffer location indicated by the encrypted message byte (m);
    determining a value corresponding with the second dynamic key buffer location;
    determining a second offset buffer value for (m); and
    determining a decrypted message value by subtracting the second offset buffer value for (m) from the value corresponding with the second dynamic key buffer location.

10. The method of claim 9, wherein the second plurality of buffers comprises:
    a second offset buffer;
    a second dynamic key buffer; and
    a second dynamic key buffer index.

11. The method of claim 10 further comprising:
    shuffling the second dynamic key buffer;
    resetting the second dynamic key buffer index; and
    continuing to the incrementing the second counter until a last encrypted message byte is received.

12. The method of claim 11, wherein the shuffling the second dynamic key buffer comprises:
    swapping a last value in the second dynamic key buffer with the encrypted message value; and
    shuffling the second dynamic key buffer upward to replace an encrypted value location.

13. The method of claim 11, wherein resetting the second dynamic key buffer index generates a location index of each value from 0 to 266 in the second dynamic key buffer after the shuffling.

14. A method for transmitting messages utilizing lightweight encryption and decryption comprising:
    encrypting the message to create an encrypted message on an encrypting device utilizing a shared key that is repeatedly updated using each transmitted data byte corresponding with the message as a randomizing component in generating the shared key, wherein the shared key is a historical hash of all preceding encrypted message transmissions between two points;
    transmitting the encrypted message; and
    decrypting the encrypted message on a decrypting device utilizing the shared key.

15. The method of claim 14, wherein the encrypting comprises:
    initializing a first plurality of buffers on the encrypting device;
    receiving the message for encrypting;
    incrementing a first counter for (n);
    determining a message byte (n);
    determining a first offset buffer value (n);
    determining a first dynamic key buffer location by summing the message byte (n) and the first offset buffer value (n); and
    determining an encrypted message value corresponding with a first dynamic key buffer value at the first dynamic key buffer location.

16. The method of claim 15, wherein the first plurality of buffers comprises:
   a first offset buffer;
   a first dynamic key buffer; and
   a first dynamic key buffer index.

17. The method of claim 16, further comprising:
   shuffling the first dynamic key buffer:
   resetting the first dynamic key buffer index; and
   continuing to the incrementing the first counter until a last message byte is received.

18. The method of claim 17, wherein the shuffling the first dynamic key buffer comprises:
   swapping a last value in the first dynamic key buffer with the encrypted message value; and
   shuffling the first dynamic key buffer upward to replace an encrypted value location.

\* \* \* \* \*